INVENTORS
CECIL PATRICK MICHAEL MITCHELL,
CHARLES WILLIAM AXCE

BY
ATTORNEY

United States Patent Office 3,605,831
Patented Sept. 20, 1971

3,605,831
INFLATABLE CLOSURE DEVICE
Cecil Patrick Michael Mitchell, Wyandotte, and Charles William Axce, Trenton, Mich., assignors to Wyandotte Chemicals Corporation, Wyandotte, Mich.
Filed Dec. 8, 1969, Ser. No. 882,988
Int. Cl. B65b 1/04, 3/04
U.S. Cl. 141—388    5 Claims

ABSTRACT OF THE DISCLOSURE

Apparatus for delivering pulverulent material to a receiving drum includes a feed chute and a drum loading closure device. The device, itself, includes a pair of apertured support members having their respective apertures coaxially aligned. The support members are secured to a tunnelway which extends through the apertures and has one end thereof secured to the feed chute and its other end communicating with the drum. A toroidal element is concentrically disposed about the tunnelway in the space defined between the two support members. Sealing means is provided on the lower support member to provide a pressure-tight seal between the device and the drum. Included also are means for urging the device into engagement with the drum.

BACKGROUND OF THE INVENTION (1) Field of the invention

The present invention relates to fluent material handling apparatus. More particularly, the present invention relates to drum loading closure devices for use with feed assemblies which deliver pulverulent materials to a receiving drum.

(2) Description of the prior art

In modern day industrial processes one of the more commonplace occurrences is the automatic or mechanized feeding of pulverulent materials, such as anhydrous caustic soda, cement, flour and the like, to receiving drums. Generally, the drums pass under a feeding mechanism along a conveyor assembly or the like and are automatically filled with the material. In carrying out this operation, the receiving drum ordinarily is passed onto a platform or table positioned under the feed assembly and into communication therewith via some type of a drum loading closure device. The drum loading closure device, which is usually secured to the feed assembly, forcingly engages the receiving drum, generally through a spring-loaded, piston operated, hood assembly. After the closure device engages the drum, pulverulent material is then fed into the drum for a predetermined amount of time or weight. The material in the drum is then compacted by vibrating the drum, generally in a sequence of intermittent vibrations through a suitable assembly, such as a jolter or the like connected to the table. The vibrations from the compacting sequence are ordinarily transmitted to not only the drum, but to the closure device and feed assembly as well because of the unification of the system produced by the sealing engagement. After this intermittent vibration sequence is terminated, more material is then added to the drum. Thereafter, the filled drum is passed from the table onto the conveyor and the next drum takes its place.

Although this operation appears to be quite simplistic and free of operational difficulties, many problems do arise. One of the more frequently encountered problems arises during the compacting sequence. During this operation the vibrational impulses, which are transmitted to the receiving drum and therefrom to both the drum loading closure as well as the feed assembly, tend to weaken the springs which urge the hood into engagement with the drum. This causes an uneven load to be applied to the drums by the closure or hood. Hence, when the drum is vibrated, it tends to "walk" on the table, breaking the seal between itself and the hood. This results in an escape of the pulverulent material from the drum to the atmosphere, which in many instances creates a health hazard because of the nature of the material being fed, e.g., caustic soda is extremely harmful to the skin. Furthermore, weakening of the springs necessitates the replacement thereof.

SUMMARY OF THE INVENTION

The present invention overcomes the problems associated with the prior art by providing a hood or drum loading closure device which obviates the problem of "walking" by employing fluid actuated means for sealingly engaging the feed assembly with the receiving drum. The present invention generally comprises first and second spaced apart support members, each of which is provided with a central aperture. The apertures are axially aligned and in registry with each other. A toroidal inflatable element is disposed between the two support members, and its central opening is coaxially aligned with the apertures provided in each of the support members.

The first support member is mounted and secured to a suitable feed assembly such as a feed chute or the like. The second support member engages the receiving drum. The bottom surface of the second support member is provided with sealing means which sealingly engages the periphery of the receiving drum to provide a pressure-tight seal therebetween.

In a first embodiment of the present invention pneumatic or hydraulic means are provided to inflate the inflatable element which thereby urges the second support member into sealing engagement with the drum. Means are also provided to normally bias the second support member toward the first support member.

In a second preferred embodiment of the present invention, the inflatable element is maintained under a constant inflated pressure and the entire drum loading closure device is urged into sealing engagement with the drum by providing suitable pneumatic or hydraulic means operatively connected to the device.

For a more complete understanding of the present invention, reference is made to the following detailed description and accompanying drawing. In the drawing, like reference characters refer to like parts throughout the several views which:

DESCRIPTION OF THE PREFERRED EMBODIMENTS

Figure 1:
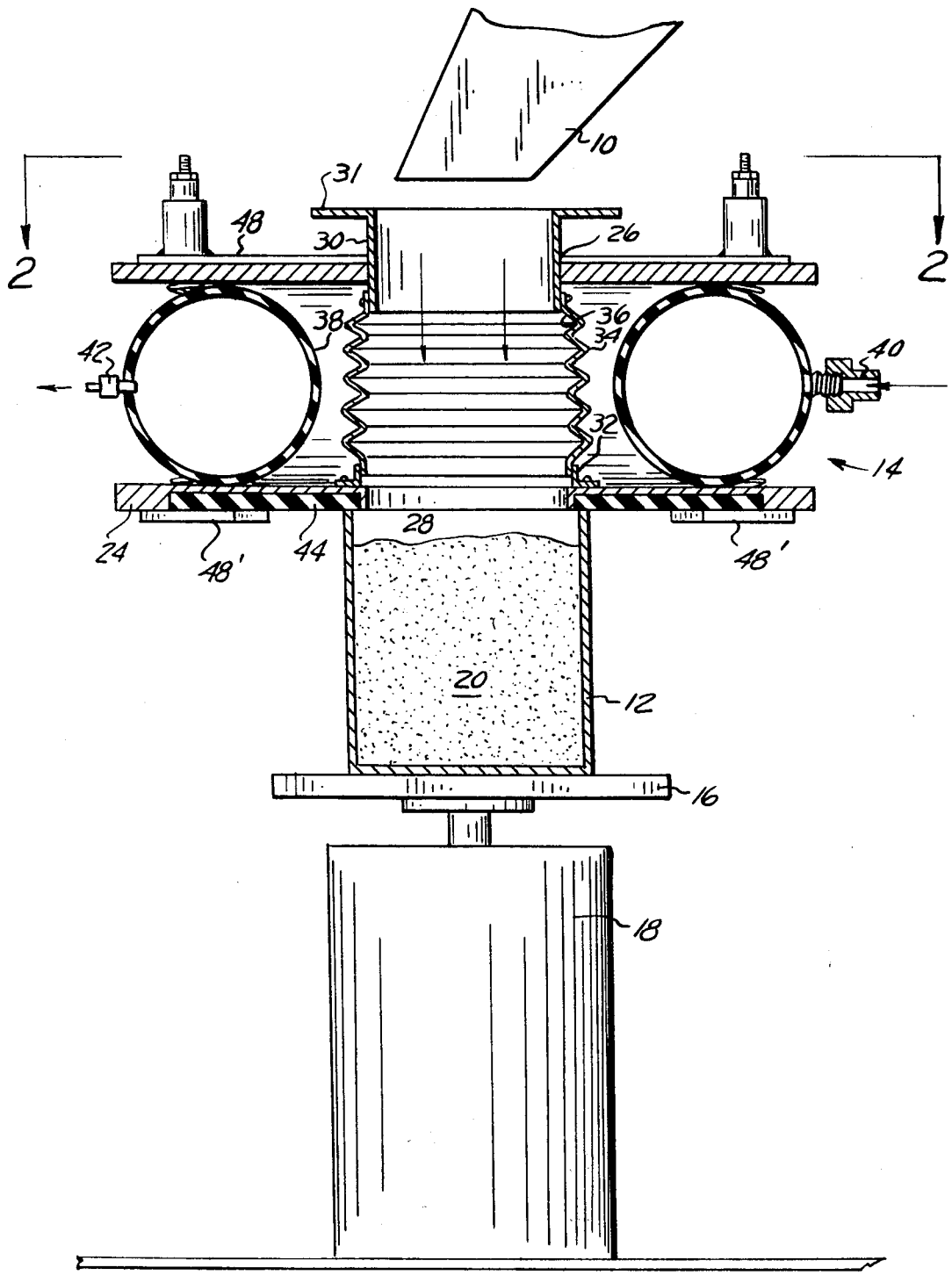
FIG. 1 is a cross-sectional view of the first embodiment of the device of the present invention wherein the second support member is in sealing engagement with a receiving drum.
Figure 2:
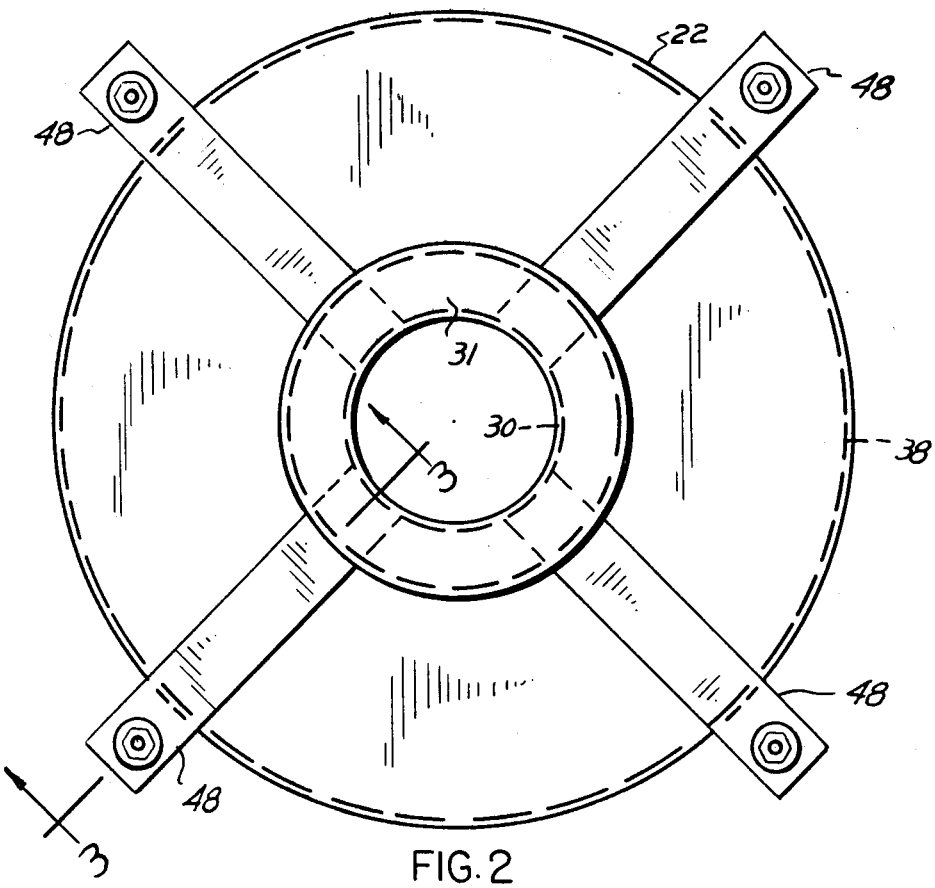
FIG. 2 is a top plan view of the device of the present invention taken along the line 2—2 of FIG. 1.
Figure 3:
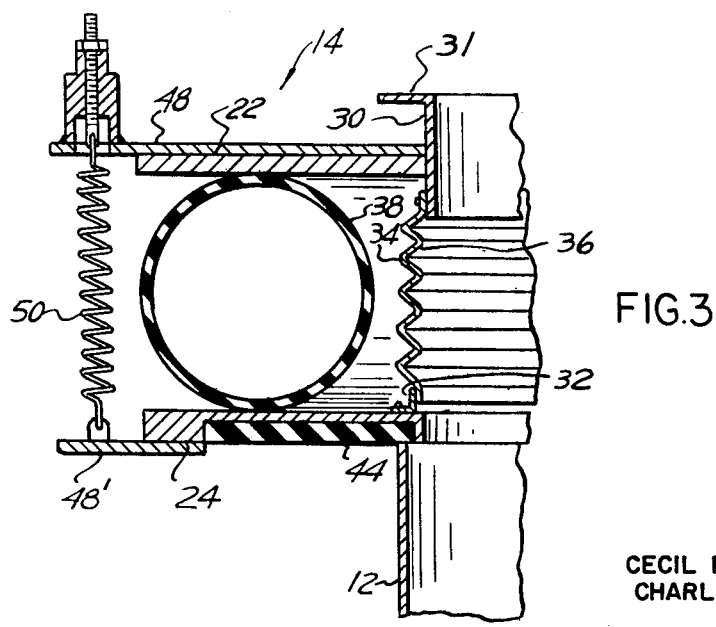
FIG. 3 is a sectional view taken along the line 3—3 of FIG. 2.

With reference now to FIGS. 1–3, there is illustrated therein a first embodiment of the present invention which is seen to include a feed chute 10 which communicates with a cylindrical, rigid walled container or receiving drum 12 through a drum loading closure device generally indicated at 14 and is adapted to deliver pulverulent material therefrom to the drum. The drum 12, which can be formed from any suitable material such as steel, fibreboard, plastic, wood or the like, is seated on a table 16. The drum 12 is delivered onto the table 16 by any conventional conveyor assembly or the like (not shown). The table 16 is mounted atop a jolter 18 which is operable to vibrate the table at predetermined intervals. The jolter 18 and its method of operation is well known and is not critical to the present invention. Generally, the jolter 18 is electrically, hydraulically, or pneumatically actuated to vibrate the table so that pulverulent material contained in the drum may be compacted in response to the vibrations transmitted from the table to the drum.

The device 14 is secured to the feed chute 10 by any conventional means such as mounting brackets or the like and in a manner described hereinafter. The device 14 includes first and second spaced apart support members 22 and 24, respectively. Each of the support members 22 and 24 has a central aperture 26 and 28, respectively, defined therein, to impart an annular configuration thereto. The apertures 26 and 28 are axially aligned and in registry with each other.

Disposed within the aperture 26 is a first tubular section 30, a portion of which extends into the space defined between the support members and a portion of which extends above the first support member 22. The tubular section 30 is secured to the support member 22 by welding it thereto, by riveting or the like. That portion of the tubular section 30 above the support member 22 is provided with an enlarged lip or annular flange 31 which has mounted thereon suitable means (not shown) for securing the section 30 to the chute 10. Thus, by securing the support member 22 to the tubular section 30 and the tubular section 30 to the feed chute 10, the device 14 of the present invention becomes affixed to the feed chute.

A second tubular section 32 which is disposed within the aperture 28 extends from the second support member 24 into the space defined between the two support members. The second tubular section 32, which has its other end terminating coplanar with the second support member is secured to the second support member 24 in a manner analogous to that employed for securing the first tubular section 30 to the first support member 22.

As shown in FIGS. 1 and 3, a resilient tubular section 34 is bonded or otherwise secured to the confronting portions of the tubular sections 30 and 32 disposed in the space defined between the two support members. The tubular sections 30 and 32 cooperate with the resilient tubular member 34 to define a tunnelway 36 which extends through the spaced apart support members. The tunnelway 36 which is in communication with both the feed chute 10 and the drum 12, provides a means for delivering pulverulent material from the chute 10 to the receiving drum 12.

Concentrically disposed about the tunnel 36 is an inflatable toroidal element 38. The toroidal element 38 can be either integrally formed with or otherwise secured to the opposing surfaces of the support members 22 and 24. A valve 40 is positioned in the element 38 and is open at one end to the interior thereof. The other end of the valve 40 is operatively connected to any suitable means (not shown) either hydraulic or pneumatic, for delivering an inflating fluid to the interior of the element 38. A second valve 42 is positioned in the element 38 and is operatively connected to an evacuation means (not shown) for withdrawing the fluid from the interior of the element 38 to deflate it.

Sealing means 44 is provided on the bottom surface of the support member 24. Sealing means 44, which can comprise a gasket, an elastomeric element or the like, is adapted to engage the periphery of the receiving drum 12 to provide a pressure-tight seal between the drum and the closure device 14.

With reference now to FIGS. 2 and 3, it is shown therein that a plurality of circumferentially spaced arms 48 and 48' are secured to the support members. These arms radially extend beyond the peripheral edges of the support members. Mounted between the arms 48, 48' proximate to the outermost end thereof are biasing means such as springs 50 or the like. The springs 50 normally urge the support member 24 toward the support member 22.

It is thus seen that when the element 38 is deflated, the resilient member 34 flexes to allow support member 24 to approach support member 22 in response to the biasing of springs 50 thereby allowing the drum 12 to be moved onto the table 16. When the element 38 is inflated, the fluid pressure introduced thereinto acts against the force of the springs 50 and extends the resilient section 34. In addition, inflating the element 38 forces the sealing means 44 into a pressure-tight sealing engagement with the drum 12 so that no material escapes from the system during delivery.

It is during the compacting or jolting sequence, however, that the advantages of the present invention over the heretofore known apparatus comes into play. Because of the resilient nature of the sealing means 44, the tubular section 34 and the element 38 as well as the fluid contained in the element 38, all vibrational forces imparted to the drum 12 which would otherwise be transmitted to the springs of the prior art systems are now absorbed completely by the above-mentioned members and distributed evenly among them. The vibrational forces are thus dissipated among members which can show no malfunctions because of the absorption. Thus, under continuous usage, no element of the apparatus becomes weakened to allow walking of the drum on the table.

Figure 4:
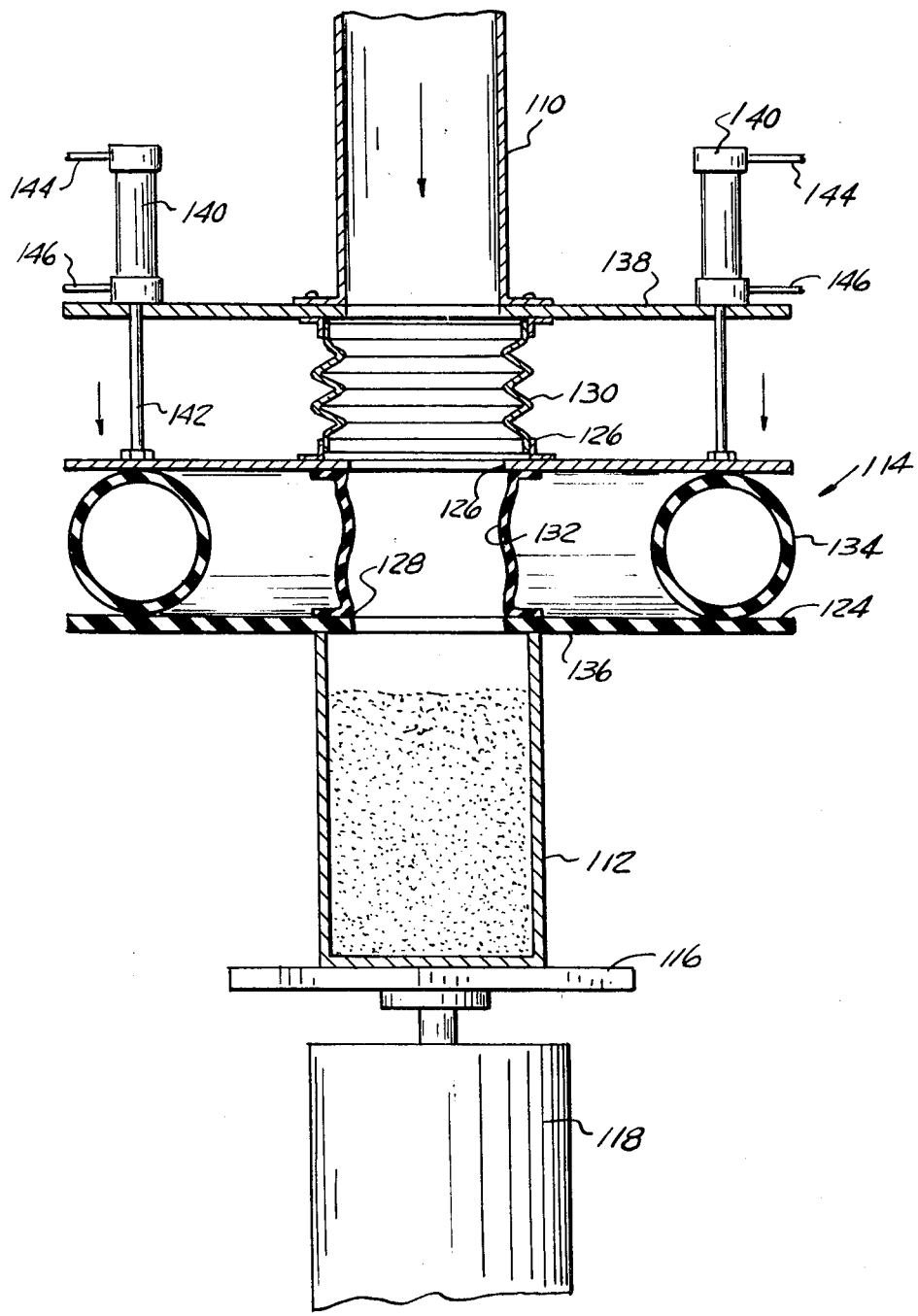
FIG. 4 is a cross-sectional view of a second embodiment of the device of the present invention wherein the device is shown in sealing engagement with a receiving drum.

With reference now to FIG. 4, there is depicted therein a second preferred embodiment of the drum loading closure device 114 of the present invention. In this embodiment there is provided a pair of spaced apart support members 122 and 124, respectively. Each of the support members 122 and 124 is provided with a central opening 126 and 128, respectively, to provide an annular configuration to the support members. The apertures 126 and 128 are axially aligned and in registry with each other.

Extending through the apertures 126 and 128 is a resilient tubular member 130 which defines a tunnelway 132 and which provides communication between the feed chute 110 and a receiving drum 112. One end of the tubular member 130 is bonded or otherwise secured to the walls of the chute 110. The other end of the member 130 terminates coplanar with the bottom surface of the support member 124. As in the first embodiment, the support members 122 and 124 are secured to the tunnelway 132 in a manner similar to that employed in the first embodiment.

A toroidal resilient element 134 is disposed concentrically about the tubular member 130 in the space defined between the two support members 122 and 124. In this embodiment, the element 134 is pre-inflated to a predetermined pressure prior to its positioning about the tubular member 130. As in the first embodiment, the element 134 can be integrally formed with or otherwise secured between the two support members.

An annular sealing means 136 such as a gasket, elastomeric annular element or the like, is secured to the bottom surface of the support member 124. The sealing means 136 is adapted to engage the peripheral rim of the drum 112 to provide a pressure-tight seal between the device 114 and the drum 112.

A mounting plate 138 overlying support member 122 and having a plurality of circumferentially spaced apertures is concentrically disposed about the feed chute 110 and is secured thereto by any conventional method such as by welding, rivets or the like. A plurality of fluid actuated, either pneumatic or hydraulic, conventional piston and cylinder assemblies 140 are mounted atop the plate 138 and overlie the apertures provided therein. The piston shafts 142 extend through these apertures and are secured to the top surface of the support member 122, as shown.

The assemblies 140 work in a manner well-known in the art to force the device 114 into sealing engagement with the drum 112. Generally speaking, a fluid is delivered from any suitable source (not shown) through a conventional solenoid valve (not shown) and is forced into the cylinders of the assemblies behind the pistons thereof through inlets 144. Introduction of the fluid behind the pistons drives them and the shafts formed therewith into their extended positions. Extension of the shafts forces the device 114 toward the drum 112 and into sealing engagement therewith.

Retraction of the shaft 142 is achieved by switching the solenoid valve so that fluid is delivered into the cylinders in front of the pistons through inlets 146 while concurrently exhausting the fluid behind the pistons. The resulting increase in fluid pressure in front of the pistons drives them away from the receiving drum 112 and thereby causes retraction of the shafts 142. Retraction of the shafts 142 urges the device 114 away from the drum 112 and breaks the seal therebetween. Hence, the device 112 is withdrawn away from the drum so that it can be removed from the table and a next one inserted in its place.

In this embodiment, the vibrational forces which occur during the compacting sequence are absorbed by the element 138, the fluid contained therein as well as the fluid contained within the cylinders 140. Again, no malfunction occurs within this apparatus when dissipating the vibrational forces.

It is to be understood that the operation of the piston and cylinder assemblies and the fluid delivery means associated therewith is conventional in the art and is not to be construed as being critical to the present invention.

It is to be understood, also, by those skilled in the art that various other apparatus can be associated with the device of the present invention. For instance, means for accommodating various size drums and the like can be incorporated into the system. Furthermore, although the device has been described with respect to a vertical compacting unit, the device is equally adaptable to a rotary type compacting unit.

What is claimed is:

1. In combination with a feed assembly for delivering a pulverulent material therefrom to a cylindrical, rigid walled receiving drum, said feed assembly including a feed chute, a flexible drum loading closure device which comprises:

(a) A first apertured support member;
    (b) A second apertured support member spaced apart from the first support member and having its aperture axially aligned with the aperture of the first support member and in communication with the feed chute and the receiving drum;
    (c) An inflatable toroidal element disposed between the space defined between the support members and secured thereto, the aperture of the toroidal element being coaxially aligned with the apertures of the support members;
    (d) Sealing means secured to the bottom surface of the second support member and adapted to provide a pressure tight seal between the flexible drum loading closure device and the receiving drum;
    (e) A tunnelway extending through the apertures provided in the first and second support members, the tunnelway having the support members secured thereto, and the tunnelway having one end thereof secured to the feed chute and its other end terminating coplanar with the second support member; and
    (f) Means for urging the flexible drum loading closure device into sealing engagement with the receiving drum.

2. The combination of claim 1 wherein the urging means comprises a valve positioned in the toroidal element and having one end open to the interior thereof and the other end operatively connected to a fluid delivery supply source such that fluid is delivered therefrom to the toroidal element thereby inflating it, whereupon inflating the element urges the flexible drum loading closure device into sealing engagement with the drum.

3. The combination of claim 2 and further including evacuation means operatively connected to the toroidal element for deflating the element.

4. The combination of claim 3 which further includes means for normally biasing the second support member toward the first support member.

5. The device of claim 1 wherein the means for urging comprises:

(a) An apertured mounting plate concentrically disposed about the feed chute and secured thereto, the mounting plate overlying the first support member;
    (b) At least one cylinder mounted on the mounting plate and overlying the aperture provided therein;
    (c) A piston coaxially slidably disposed within the cylinder;
    (d) A piston shaft formed with the piston and having its free end extending through the aperture in the mounting plate and secured to the first support member; and
    (e) Fluid operated means for driving the piston within the cylinder such that extension of the shaft forces the device into sealingly engagement with the receiving drum and retraction of the piston shaft breaks the seal therebetween.

References Cited

UNITED STATES PATENTS 2,832,378   4/1958   Beavon _____ 141—287

HOUSTON S. BELL, Jr., Primary Examiner

U.S. Cl. X.R.

141—392